Feb. 22, 1955     O. CLINE     2,702,492
REFLECTING PICTURE LAMP
Filed Aug. 9, 1951     2 Sheets-Sheet 1
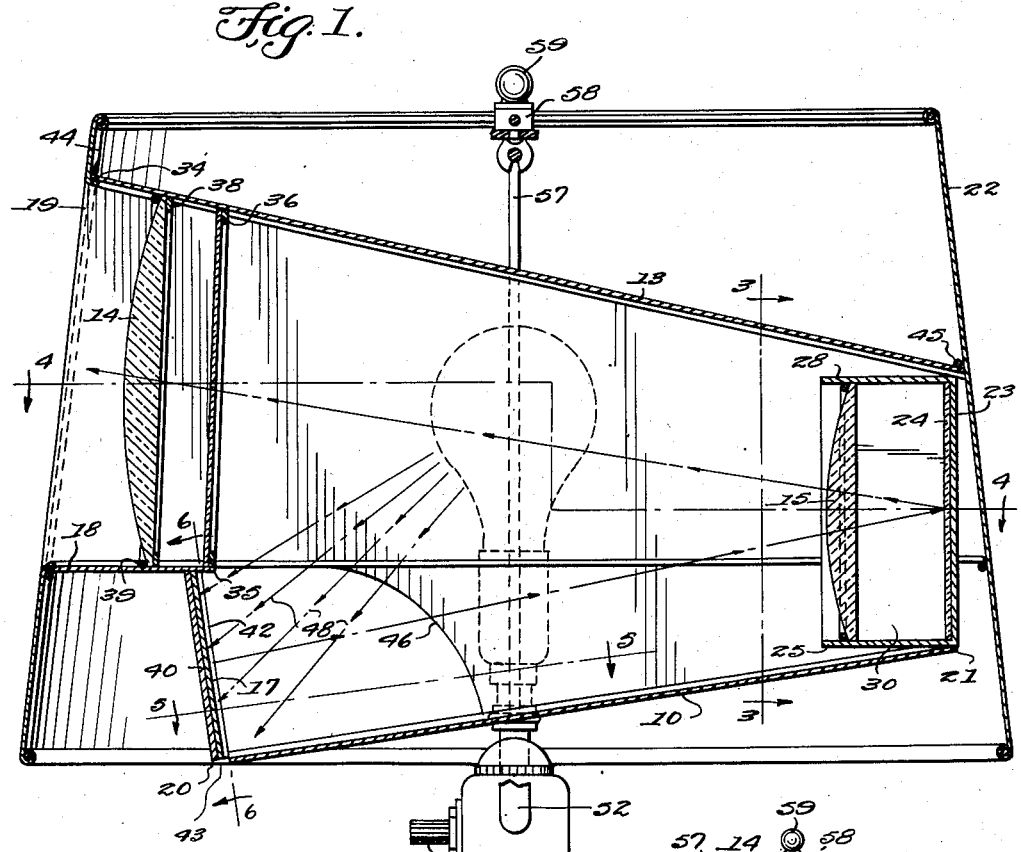
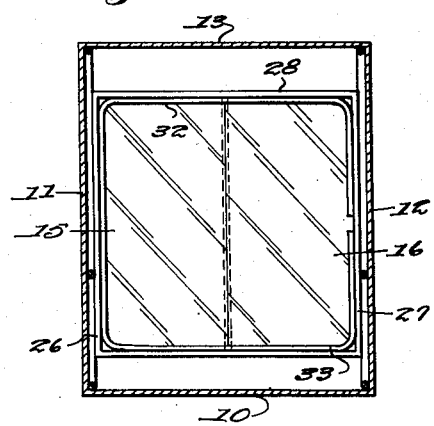
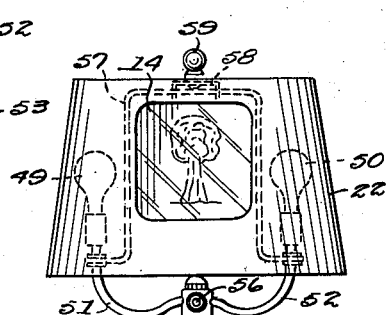
INVENTOR.
Orville Cline,
BY Victor J. Evans & Co.
ATTORNEYS Feb. 22, 1955 O. CLINE 2,702,492
REFLECTING PICTURE LAMP
Filed Aug. 9, 1951 2 Sheets-Sheet 2

INVENTOR.
Orville Cline,
BY Victor J. Evans & Co.
ATTORNEYS

United States Patent Office 2,702,492
Patented Feb. 22, 1955

2,702,492

REFLECTING PICTURE LAMP

Orville Cline, Baisden, W. Va.

Application August 9, 1951, Serial No. 241,010

3 Claims. (Cl. 88—29)

This invention relates to table or floor lamps having shades suspended over light bulbs, and in particular a housing having a stereoscopic device incorporated therein, adapted to provide a lamp shade, and in which lenses are positioned to reflect a picture from a frame or slide in a lower channel through a pair of double convex lenses to a lens positioned above the slide or frame whereby with the picture photographed in third dimension a picture having the appearance of having a third dimension is produced on the lens.

The purpose of this invention is to provide picture viewing elements adapted to be used in a lamp shade whereby the light of lamp bulbs in the shade illuminates a picture and the picture is reflected by a plurality of lenses so that a floor or table lamp may be used for viewing photographs and the like with the photographs reproduced on a lens positioned in one side of the lamp shade.

Various devices have been provided for displaying photographic and other pictures and in numerous instances it is difficult to obtain sufficient light for viewing pictures to obtain the best results. With this thought in mind this invention contemplates a stereoscopic device formed in a casing mounted in a frustro-conical shaped housing and adapted to be used as a lamp shade whereby the light rays of lights in the shade illuminate a picture and particularly a picture having third dimension whereby the picture is efficiently produced on a lens in one side of the lamp shade.

The object of this invention is, therefore, to provide means for providing a stereoscope in a housing adapted to be used as a lamp shade and in particular a stereoscope adapted to reproduce pictures in third dimension.

Another object of the invention is to provide means for incorporating a stereoscopic device in a lamp shade whereby the lamp shade is also adapted for use in the conventional manner.

A further object of the invention is to provide a third dimensional stereoscopic device that is adapted to be used as the shade of a table or floor lamp which is of a simple and economical construction.

With these and other objects and advantages in view the invention embodies a substantially V-shaped casing incorporated in the shape of a lamp with a lens providing a screen in one end of the casing, a slider holder in the opposite end of the casing, and a pair of convex reflecting lenses positioned at a point substantially midway of the length of the casing.

Other features and advantages of the invention will appear from the following description taken in connection with the drawings, wherein:

Figure 1 is a vertical section through a housing adapted to be used as a lamp shade and also through a casing in the housing being taken on line 1—1 of Figure 4.

Figure 2 is a side elevational view of a table lamp with the stereoscope of this invention incorporated in the shade thereof.

Figure 3 is a cross section through the casing incorporated in the housing being taken on line 3—3 of Figure 1.

Figure 4:
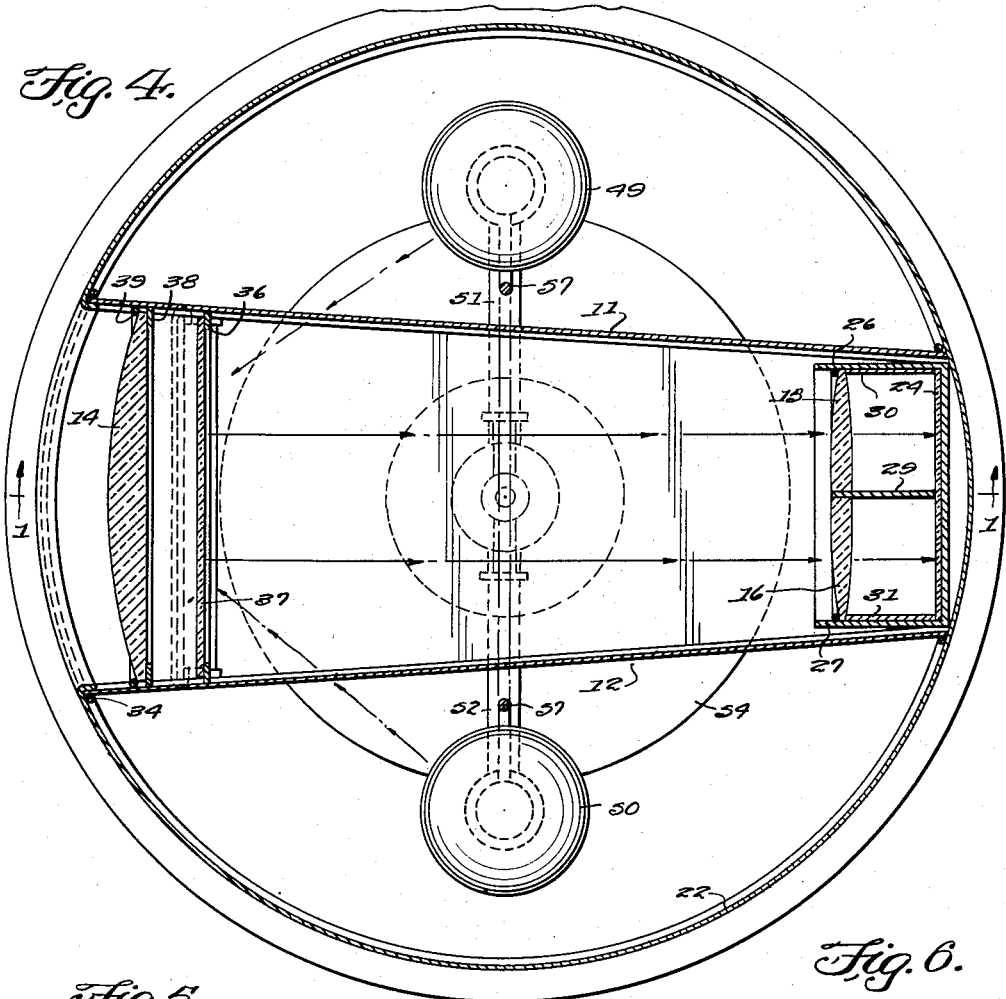
Figure 4 is a sectional plan through the housing taken on line 4—4 of Figure 1.
Figures 5, 6:
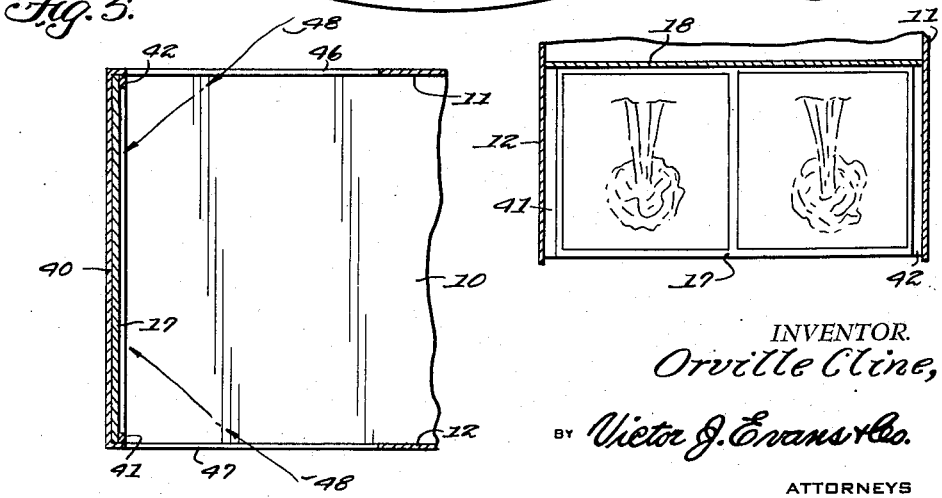
Figure 5 is a detail showing a sectional plan through the lower section of the casing being taken on line 5—5 of Figure 1.
Figure 6 is a cross section through the lower part of the casing taken on line 6—6 of Figure 1 and showing a double picture in a frame removably mounted in the casing.

Referring now to the drawing wherein like reference characters denote corresponding parts the stereoscope of this invention includes a casing positioned in a frustro-conical shaped housing adapted to be used as a lamp shade with one end of the casing incorporated in an opening or window in one side of the housing, and the casing which is formed with a base 10 having side walls 11 and 12 and a cover 13, and which is provided with a lens 14, lenses 15 and 16, and a slide holding frame 17, is positioned in the housing with the large end 18 positioned in an opening 19 in one side thereof.

The base 10 of the inner casing slopes upwardly from a point 20 to a point 21 at the opposite side of the housing 22.

This end of the casing is provided with a box like unit having a base or rear wall 23 against which a reflector 24 is positioned and from the edges of the rear wall 23 there extends a lower panel 25, side panels 26 and 27 and an upper panel 28. A double convex lens having sections 15 and 16 is carried by a box formed by the panels 25, 26, 27 and 28 with the sections of the lens separated by a partition 29 and the edges held against shoulders 30 and 31 on the inner surfaces of the side panels 26 and 27, respectively by an upper U-shaped spring retainer 32 and a similar lower spring retainer 33.

From the upper end of the rear wall 23 the upper panel of the casing, as indicated by the numeral 13, extends upwardly to a point 34 at the upper edge of the opening 19 and from the lower edge of the opening 19 the panel 18 extends inwardly to a point 35 on which a flange 36 is provided and a glass plate 37, positioned against the flange 36 marks the point where the image reflected from pictures in the frame 17 appears.

The screen lens 14 is positioned against a continuous flange 38 against which it is held by a spring retainer 39.

A panel 40 connects the forward end of the sloping base 10 to the under surface of the panel 18 and clips 41 and 42 at the edges of the panel 40 provide means for holding the frame 17 in position. The frame 17 may be inserted through an opening 43 which extends through the lower point of the base 10.

The large end of the inner casing is mounted against the inner surface of the housing 22 with a continuous wire ring 44 and a similar ring 45 is provided at the opposite side of the housing for holding the opposite end of the casing.

The lower corners of the side walls 11 and 12 are provided with openings 46 and 47, respectively, and light rays as indicated by the arrows 48 extend from light bulbs 49 and 50 on arms 51 and 52 of a lamp base or pedestal 53 upon which the housing may be positioned whereby pictures held in frame 17 and positioned between the panels 40 are illuminated.

The base or pedestal 53 is provided with a mounting flange 54 and current is supplied to the lamp through a lamp cord 55. The upper end of the pedestal 53 is provided with a light switch 56 whereby the lights may be turned on and off as desired.

With the parts formed in this manner pictures or slides taken in third dimension or from a plurality of points and positioned in the frame 17 are reflected through the lenses 15 and 16 by the reflector 24 and by this means the images are reflected on the lens 14 which displays the picture through the opening 19 in the wall of the housing 22.

It will be appreciated that a housing of any type or design may be used and the housing is mounted upon the upper end of the pedestal 53 by suitable conventional means.

It will be noted in Figure 2 that a typical means of supporting the housing is illustrated wherein a yoke 57, as indicated by the dotted line is mounted on the ends of the arms 51 and 52 and a friction clip 58, having a knob 59 thereon, is mounted on the horizontal section of the yoke 57. By this means the housing may be tilted to a suitable position.

It will be understood that modifications may be made in the design and arrangement of the parts without departing from the spirit of the invention.

What is claimed is:
1. In a stereoscope device, the combination which comprises a frustro-conical shaped housing adapted for use as a lamp shade, a pedestal having lamp sockets on the ends of outwardly and upwardly extended arms on the upper end, said housing having an opening in one side and positioned over the upper ends of the said arms, a means adapted to support the housing from the arms, a casing having openings in the sides thereof positioned between the ends of the arms and mounted in the housing, said casing being positioned whereby the openings in the sides thereof are adapted to receive rays of light from lamp bulbs carried by the arms, a slide holding frame removably mounted in the casing, said casing extended from the slide holding frame to the opposite side of the housing and from the said opposite side of the housing across the center of the shade and to a point corresponding with the opening through the housing, a lens mounted in the casing and positioned in the end extended from the opening of the housing, the end of the casing in which the lens is mounted being positioned above the slide holding frame, a box like member having a vertically disposed partition located midway of the width thereof carried by the end of the casing opposite to that in which the lens is positioned, a reflector mounted against the base of the said box like member, and a pair of convex lenses mounted in the said box like member and positioned on opposite sides of the said partition.

2. In a stereoscope device, the combination which comprises a frustro-conical shaped housing adapted for use as a lamp shade, a pedestal having lamp sockets on the ends of outwardly and upwardly extended arms on the upper end, said housing having an opening in one side and positioned over the upper ends of the said arms, means adapted to support the housing from the arms, a casing having openings in the sides thereof positioned between the ends of the arms and mounted in the housing, said casing being positioned whereby the openings in the sides thereof are adapted to receive rays of light from lamp bulbs carried by the arms, a slide holding frame removably mounted in the casing, said casing extended from the slide holding frame to the opposite side of the housing and from the said opposite side of the housing across the center of the shade and to a point corresponding with the opening through the housing, a lens mounted in the casing and positioned in the end extended from the opening of the housing, the end of the casing in which the lens is mounted being positioned above the slide holding frame, a box like member having a vertically disposed partition located midway of the width thereof carried by the end of the casing opposite to that in which the lens is positioned, a reflector mounted against the base of the said box like member, a pair of convex lenses mounted in the said box like member and positioned on opposite sides of the said partition, and a continuous image defining frame extended around the inner surface of the casing and spaced from the lens in the end of the casing extended from the opening of the housing.

3. In a stereoscope device, the combination which comprises a frustro-conical shaped housing adapted for use as a lamp shade, a pedestal having lamp sockets on the ends of outwardly and upwardly extended arms on the upper end, said housing having an opening in one side and positioned over the upper ends of the said arms, means adapted to support the housing from the arms, a casing having openings in the sides thereof positioned between the ends of the arms and mounted in the housing, said casing being positioned whereby the openings in the sides thereof are adapted to receive rays of light from lamp bulbs carried by the arms, a slide holding frame removably mounted in the casing, said casing extended from the slide holding frame to the opposite side of the housing and from the said opposite side of the housing across the center of the shade and to a point corresponding with the opening through the housing, a lens mounted in the casing and positioned in the end extended from the opening of the housing, the end of the casing in which the lens is mounted being positioned above the slide holding frame, a box like member having a vertically disposed partition located midway of the width thereof carried by the end of the casing opposite to that in which the lens is positioned, a reflector mounted against the base of the said box like member, a pair of convex lenses mounted in the said box like member and positioned on opposite sides of the said partition, and a continuous image defining frame extended around the inner surface of the casing and spaced from the lens in the end of the casing extended from the opening of the housing, said slide holding frame positioned to receive rays of light from lamps carried by the arms on the upper end of the pedestal through the openings in the sides of the casing.

References Cited in the file of this patent

UNITED STATES PATENTS

| | | |
|---|---|---|
| 1,863,607 | Sabath | June 21, 1932 |
| 1,972,019 | Kanolt | Aug. 28, 1934 |
| 2,177,204 | Buzick et al. | Oct. 24, 1939 |
| 2,297,322 | Rasco | Sept. 29, 1942 |
| 2,511,646 | Marmour | June 13, 1950 |
| 2,520,432 | Robertson | Aug. 29, 1950 |

FOREIGN PATENTS

| | | |
|---|---|---|
| 875,974 | France | July 13, 1942 |